(12) United States Patent
Smith (10) Patent No.: US 7,177,550 B1
(45) Date of Patent: Feb. 13, 2007

(54) ON-AXIS LASER RECEIVER WAVELENGTH DEMULTIPLEXER WITH INTEGRAL IMMERSION LENSED DETECTORS

(75) Inventor: Robert J. Smith, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 657 days.

(21) Appl. No.: 10/053,679

(22) Filed: Jan. 21, 2002

Related U.S. Application Data (60) Provisional application No. 60/264,079, filed on Jan. 24, 2001.

(51) Int. Cl.
*H04B 10/00* (2006.01)

(52) U.S. Cl. .................. 398/212; 398/202; 398/118

(58) Field of Classification Search ........ 398/118–131, 398/182–201, 202–214
See application file for complete search history.

(56) References Cited

U.S. PATENT DOCUMENTS

| | | | |
|---|---|---|---|
| 2,964,636 A | | 12/1960 | Cary ........................ 250/211 |
| 3,161,772 A | | 12/1964 | Merlen ...................... 250/83.3 |
| 3,239,675 A | | 3/1966 | Morey et al. ................ 205/211 |
| 3,609,365 A | * | 9/1971 | Malinowski .............. 250/338.1 |
| 3,746,427 A | | 7/1973 | Foster ........................ 350/161 |
| 3,923,400 A | | 12/1975 | Hardy ........................ 356/107 |
| 4,092,531 A | * | 5/1978 | Moss .......................... 250/216 |
| 4,115,701 A | * | 9/1978 | Guichard .................... 250/552 |
| 4,214,807 A | | 7/1980 | Gfeller et al. .............. 350/3.73 |
| 4,227,090 A | * | 10/1980 | Amboss ...................... 250/492.2 |
| 4,455,061 A | | 6/1984 | Case .......................... 350/3.75 |
| 4,490,981 A | | 1/1985 | Meckler ................... 60/641.15 |
| 4,547,037 A | | 10/1985 | Case .......................... 350/3.75 |
| 4,629,892 A | | 12/1986 | Carmichael et al. ........ 250/353 |
| 4,636,631 A | | 1/1987 | Carpentier et al. ......... 250/216 |
| 4,643,519 A | | 2/1987 | Bussard et al. ........... 350/96.19 |
| 4,687,282 A | * | 8/1987 | Ferrante ..................... 235/457 |
| 4,783,134 A | | 11/1988 | Hara et al. ................. 350/3.64 |
| 4,797,179 A | | 1/1989 | Watson et al. .............. 156/647 |
| 4,810,047 A | | 3/1989 | Pernick ...................... 350/3.72 |
| 4,909,612 A | | 3/1990 | Scerbak et al. .............. 330/375 |

(Continued)

FOREIGN PATENT DOCUMENTS

WO     WO 00/79690 A2     12/2000

(Continued)

OTHER PUBLICATIONS

Office Action dated Dec. 20, 2004 for U.S. Appl. No. 10/054,150.

(Continued)

*Primary Examiner*—Agustin Bello
(74) *Attorney, Agent, or Firm*—Sheridan Ross P.C.

(57) ABSTRACT

The present invention is directed to a laser communication receiver for wireless optical communication. A laser communication receiver includes a diffractive optical element to permit detectors at different spatial locations to detect different wavelengths of the optical signal. An immersion lens may be employed to focus the optical signal to a spot size smaller than the photoactive area of the detector. In one detector configuration, the optical signal is folded by a reflective surface and focused on a plurality of stacked detectors. The present invention further provides a method of manufacturing a detector and immersion lens assembly that provides a high degree of alignment between the lens and the corresponding detector.

73 Claims, 7 Drawing Sheets

U.S. PATENT DOCUMENTS

| | | | | |
|---|---|---|---|---|
| 4,939,369 A * | 7/1990 | Elabd | 250/332 |
| 4,957,336 A * | 9/1990 | Hasegawa et al. | 359/17 |
| 4,975,926 A * | 12/1990 | Knapp | 375/141 |
| 5,078,499 A | 1/1992 | LaMarche | 359/19 |
| 5,150,171 A * | 9/1992 | Hill et al. | 356/128 |
| 5,153,670 A | 10/1992 | Jannson et al. | 356/301 |
| 5,206,499 A | 4/1993 | Mantravadi et al. | 250/203.6 |
| 5,227,859 A | 7/1993 | Leib et al. | 556/347 |
| 5,229,593 A | 7/1993 | Cato | 250/205 |
| 5,248,884 A | 9/1993 | Brewitt-Taylor et al. | 250/338.4 |
| 5,255,065 A * | 10/1993 | Schwemmer | 356/4.01 |
| 5,274,479 A | 12/1993 | Zmek et al. | 359/15 |
| 5,303,024 A * | 4/1994 | Thierman | 356/128 |
| 5,331,621 A | 7/1994 | Miyake et al. | 369/112 |
| 5,373,182 A * | 12/1994 | Norton | 257/440 |
| 5,438,187 A * | 8/1995 | Reddersen et al. | 235/462.22 |
| 5,444,236 A * | 8/1995 | Ludington et al. | 250/208.1 |
| 5,469,250 A * | 11/1995 | Holmes | 356/28 |
| 5,530,565 A | 6/1996 | Owen | 359/15 |
| 5,545,896 A * | 8/1996 | Bratt et al. | 250/338.4 |
| 5,565,668 A * | 10/1996 | Reddersen et al. | 235/462.22 |
| 5,610,733 A | 3/1997 | Feldman et al. | 359/9 |
| 5,610,734 A * | 3/1997 | Aharoni et al. | 359/16 |
| 5,652,813 A | 7/1997 | Wilson | 385/24 |
| 5,685,505 A | 11/1997 | Meckler | 244/169 |
| 5,691,830 A | 11/1997 | Dickson et al. | 359/15 |
| 5,691,989 A | 11/1997 | Rakuljic et al. | 372/20 |
| 5,726,786 A | 3/1998 | Heflinger | 359/152 |
| 5,757,523 A * | 5/1998 | Wood et al. | 359/15 |
| 5,781,257 A * | 7/1998 | Gal et al. | 349/57 |
| 5,818,614 A | 10/1998 | Nicolas et al. | 359/7 |
| 5,867,315 A * | 2/1999 | Koike et al. | 359/495 |
| 5,872,621 A | 2/1999 | Wilkerson et al. | 356/28.5 |
| 5,909,299 A | 6/1999 | Sheldon, Jr. et al. | 359/172 |
| 5,946,281 A * | 8/1999 | Ito et al. | 369/112.07 |
| 5,959,752 A | 9/1999 | Ota | 359/152 |
| 5,978,121 A | 11/1999 | Fischer et al. | 359/156 |
| 6,007,747 A * | 12/1999 | Blake et al. | 264/2.5 |
| 6,012,854 A | 1/2000 | Kyoya | 385/88 |
| 6,043,918 A | 3/2000 | Bozzay et al. | 359/172 |
| 6,114,688 A | 9/2000 | Tanaka et al. | 250/216 |
| 6,236,508 B1 * | 5/2001 | Stapelbroek | 359/565 |
| 6,289,151 B1 * | 9/2001 | Kazarinov et al. | 385/32 |
| 6,370,422 B1 * | 4/2002 | Richards-Kortum et al. | 600/478 |
| 6,381,044 B1 * | 4/2002 | Schuster et al. | 359/16 |
| 6,496,252 B1 * | 12/2002 | Whiteley | 356/121 |
| 6,536,899 B1 | 3/2003 | Fiala | 351/168 |
| 6,556,517 B1 * | 4/2003 | Nakajima | 369/13.13 |
| 6,574,174 B1 * | 6/2003 | Amble et al. | 369/44.26 |
| 6,580,534 B2 * | 6/2003 | Madsen | 398/63 |
| 6,608,808 B1 * | 8/2003 | Bell et al. | 369/112.24 |
| 6,614,742 B2 * | 9/2003 | Ueyanagi | 369/118 |
| 6,633,439 B1 * | 10/2003 | Xu et al. | 359/719 |
| 6,687,196 B1 * | 2/2004 | Ueyanagi | 369/13.33 |
| 6,700,856 B2 * | 3/2004 | Ueyanagi | 369/112.23 |
| 2001/0013960 A1 * | 8/2001 | Popovich et al. | 385/32 |
| 2006/0152700 A1 * | 7/2006 | Yamada | 355/55 |

OTHER PUBLICATIONS

Office Action dated Dec. 28, 2004 for U.S. Appl. No. 10/053,699.

* cited by examiner

ON-AXIS LASER RECEIVER WAVELENGTH DEMULTIPLEXER WITH INTEGRAL IMMERSION LENSED DETECTORS

CROSS REFERENCE TO RELATED APPLICATIONS

The present application claims under 35 U.S.C.§119(e) the benefits of U.S. Provisional Application Ser. No. 60/264,079, filed Jan. 24, 2001, entitled "On Axis Laser Receiver Wavelength Demultiplexer with Integral Immersion Lensed Detectors", which is incorporated herein by reference. Cross reference is made to U.S. patent application Ser. No. 09/339,316, filed Jun. 23, 1999, to Smith entitled "RECEIVING MULTIPLE WAVELENGTHS AT HIGH TRANSMISSION RATES", which is incorporated herein by this reference.

FIELD OF THE INVENTION

The present invention relates to laser communication receivers, and more specifically to an apparatus and method to receive high data rate signals transmitted through free space.

BACKGROUND INFORMATION

Various communication systems are known for transmitting through the atmosphere. Most commonly, microwave communication devices are used for this communication. Additionally, various optical techniques for communication are known.

Microwave technologies used for data links through the atmosphere generally suffer from low data rates. For example, an 11 to 14 or 20 to 30 gigahertz (GHz) carrier is sometimes used to transmit between a satellite and a ground station. However, modulating 1 gigabit/sec. data rates on the 18 GHz carrier is not currently practically accomplished. By increasing the carrier frequency, the data rate may also be increased. For example, a 60 GHz carrier could support modulation data rates of 1 gigabit/sec. or higher. However, the atmosphere itself attenuates the 60 GHz carrier such that transmission through the atmosphere is not practical.

Terrestrial-based, free-space optical (laser) transmission systems are being considered as a replacement for free space microwave communications systems. Laser systems generally enable data to travel between a ground-based transmitter and a ground-based receiver at high rates a data rates. In laser communication systems, an optical carrier is modulated with data to transmit information through the atmosphere. Adaptive optic subsystems may be used to focus the light on a receiver, thereby improving beam quality. The focused light can be collected into a single mode or multi-mode optical fiber and transmitted via the optical fiber to a de-multiplexing element.

Although laser systems can realize high data transmission rates, they can have significant drawbacks.

For example, conventional non-diffractive telescopes focus not only the optical signal but also sunlight onto other optical components. This can cause significant damage to the components, saturate the system, or introduce noise into the optical signal, causing higher bit error rates (BER).

Laser receivers can demultiplex different wavelength bands within the received power that is converging to a focus from the primary optical lens. Such demultiplexing typically requires recollimation of the received beam, reflecting the beam off a line-of-sight stabilization mirror, routing through an optical fiber, collimation after passage via the fiber to a series of bandpass filters, each of which diverts a particular wavelength to an exit lens and fiber for routing to a detector unit. This cumbersome configuration can suffer from significant optical losses, is tedious, and costly. Laser systems typically require the transmit and/or receive telescopes to be large (e.g., have an aperture of more than 20 inches) and therefore expensive. By way of example, when a telescope's aperture size is increased from 10 to 20 inches the cost also increases by a factor of 5 or 6. The need to collect the light onto the optical fiber introduces additional size and expense. The fiber can normally only receive light that is within a 30° cone, which, for a large receive aperture, requires a long optical path from the telescope to the fiber.

Laser receivers can have high BERs. BERs can be increased by the effects of atmospheric turbulence. The effects of atmospheric disturbances from thermal air currents along the optical path are typically greatest at the transmitter and receiver. For a terrestrial link, the transmitter and receiver are typically (compared to other parts of the optical path) in closest proximity to thermal sources, namely solid surfaces such as the ground and rooftops, which absorb solar flux and warm the air. The warm air rises through cooler air thereby generating turbulence and providing a non-uniform propagation medium for the optical signal. At the transmitter, such disturbances can cause different portions of the optical beam to pass through differently moving air currents, causing the propagating beam to break up, so leaving the receive aperture in an intensity minimum. Similar disturbances near the receive aperture can cause the focal spot to break up, leaving the detector in an intensity minimum. Each of these distinct processes can produce burst errors in the communicated data and must be addressed separately. As will be appreciated, a burst error refers to a period of optical extinction. The focal spot of the optical beam can be smeared. If the received optical signal power has passed through air, atmospheric turbulence will inevitably smear out the focal spot somewhat relative to the desired focal spot diameter. Imperfections in the primary optical lens can also smear out the focal spot. Since only small detectors, e.g., 60 microns in diameter, are able to respond fast enough to resolve temporarily the 400 picosecond pulses of wideband, e.g., 2.5 Gbps, data streams, the efficiency of any such detector is downgraded by its inability to collect all the power in the focal spot.

SUMMARY OF THE INVENTION

In accordance with the present invention, apparatuses and methods for high-bandwidth wireless data transmission, particularly through the atmosphere, are disclosed.

In a first embodiment, a primary optical lens that is a diffractive optical element, such as a transmissive or reflective hologram, zone plate, etc., receive radiation of one or more wavelengths that has been modulated by high frequency data. As will be appreciated, a diffractive optical element spatially separates different wavelengths of radiation or wavelength bands, preferably focusing each wavelength or wavelength band of radiation to a different spatial location. A detector assembly, that is responsive to the respective focused radiation, is preferably positioned at or near each focal area or point. Each detector assembly detects the data in the respective beam focused on the detector assembly. In one configuration, the detector assemblies are in a stacked or end-to-end configuration and are located along a common axis, which can be the optical axis of the primary optical lens.

This receiver configuration can realize high data transmission rates through free space without the drawbacks associated with conventional telescope receivers. As used herein, "transmission through free space" and "free space transmission" refers to a beam of radiation traversing an optical path, at least a portion of which is free of a waveguide, such as an optical fiber. Free space transmission, for example, includes transmission of radiation through the earth's atmosphere such as between two earth-based stations or between an earth-based and space-based station and through space such as between two space-based stations. The receiver of the present invention can be much less inexpensive and smaller than conventional telescope receivers, and operated for long intervals of time and during daylight without damaging optical components in the receiver.

The laser communication receiver differs from previous methods of wavelength demultiplexing in that the present invention need not collimate, repoint and reroute to a separate demultiplexer signal power that is converging to a focus from the primary optical lens. The detector units of the laser communication receiver of the present invention are in the converging beam of the primary optical lens. Since a diffractive optical element focuses different wavelengths to different on-axis locations, placement of detector units at these on-axis locations results in channel separation. The primary optical lens focuses at least most of the sunlight beyond the detector units if at all. Only that portion, if any, of the sunlight having the proper wavelength can be focused on each detector assembly.

In another embodiment, the detector assembly for a laser communication receiver includes a focusing element (in addition to the diffractive optical element) to reduce further the spot size of the radiation focused on the detector assembly. The focusing element can be any lens that further decreases the spot size of the radiation. Examples of such focusing elements include a solid immersion lens (SIL), and an oil immersion lens. The detector is typically in physical contact with or "immersed" in the focusing element.

The additional focusing element is particularly effective in accounting for the detrimental effect of atmospheric turbulence, lens imperfections, and window imperfections on data transmission. The focusing element increases detector efficiency by reducing the spot size of the focused radiation to a size smaller than the size of the photoactive area of the detector unit. The small spot size reduces the adverse effect of atmospheric turbulence and lens imperfections on data transmission. The focusing element averages out such adverse effects by permitting the detector unit to collect a greater amount of the radiation contacting the receiver aperture than has previously been possible. This feature thus provides a more robust laser communication receiver.

The aperture size of the receiver preferably is larger than the Fresnel scale. Because atmospheric turbulence is a common phenomenon, destructive interference is typically present in some portion of the beam incident on the receiver. If not bigger than the Fresnel scale (i.e., given as $\sqrt{\lambda \cdot Z}$, where $\lambda$=propagation wavelength and $Z$=propagation distance), the receiver aperture can encounter periods where the entire subtended optical signal is nonexistent due to turbulence far from the receiver.

In yet another embodiment, a laser communication receiver, that is particularly useful for free space transmission, includes a reflective surface for reflecting the focused optical signal onto a detector positioned to receive the reflected radiation. The reflective surface can be any suitable reflecting optical element such as a full or partial silvered mirror. In one configuration, a number of detector assemblies are positioned in a hole of the primary optical lens and the reflective or refractive surface is positioned on a first side of the lens where the radiation is focused. The optical path is folded back on itself such that the direction of the reflected optical path is at least substantially parallel to the incoming optical path direction. In this configuration, some of the detector assemblies can be located on the opposite second side and/or on the first side of the lens. This receiver configuration has a shallow depth and is compact and robust in design.

Another embodiment provides a method of manufacturing a detector assembly. The optical detector unit is formed on an at least substantially transparent substrate and a curved (or spherical or essentially hemispherical) surface (or SIL) is formed on the other side of the substrate. As noted above, the curved surface focuses the radiation onto the detector unit and thereby reduces the spot size of the incoming radiation.

This method has a number of benefits. An SIL is typically small, e.g., about 200 microns diameter, if it is to collect the smeared out power. Such a small lens is difficult to align to an approximately 60 micron detector unit, particularly when optical contact typically requires a spring-loaded assembly and wire bond attachment points are in locations where they impede the optical contact. Making the SIL an integral part of the detector can eliminate these alignment problems.

In yet another embodiment, the laser receiver is synergistically combined with a laser communication transmitter is provided that emits a beam having a smaller diameter than the inner scale as measured at the transmitter aperture to realize unexpected benefits. Such beams can substantially minimize power fades from atmospheric turbulence and therefore the occurrence of burst errors. As used herein, "inner scale" refers to the smallest distance across which an air temperature difference can be sustained. Because the critical first few meters of especially strong turbulence are within the Rayleigh range (i.e., given by $$\frac{(\text{beam diameter})^2}{1.27\lambda}\Bigg),$$

the beam diameter is kept so small as to see only minimal refractive index variation across its diameter and thereby avoids the wavefront distortions which could have Fourier-transformed to an interference pattern in the far-field. The beam thus inhibits large area destructive interference near the receive aperture. The far-field divergence angle is large enough (typically from about 0.1 to about 2.0 milliradians and more typically from about 0.4 to about 1.0 milliradian) that it cannot be steered off the receiver by the turbulent air. The bigger far-field divergence angle reduces the interference of portions of the beam beyond its Rayleigh range, by virtue of their divergent Poynting vectors. In one configuration, a relatively large, low quality laser communication receiver aperture (i.e., photon bucket), typically on the order of at least about 0.2 m and more typically about 0.4 m, can then adjust for the big transmit divergence by subtending a large solid angle from the transmitter. The larger aperture captures enough of the radiation to compensate for the lower intensity radiation from the purposely broadened transmit beam.

The laser transmitter and laser receiver described above can provide low bit error rates for a given set of atmospheric conditions. Typically, the bit error rate is no more than about $1 \times 10^{-9}$ and even more typically no more than about $1 \times 10^{-12}$. This is much lower than the typical minimum achievable bit error rate in most applications, which is approximately $1 \times 10^{-6}$.

Additional advantages of the present invention will become readily apparent from the following discussion, particularly when taken together with the accompanying drawings.

DETAILED DESCRIPTION

The architecture of the present invention controls the detrimental effects of atmospheric turbulence at the transmitter by using a beam having a smaller diameter than the inner scale as measured at the transmit aperture and/or that is divergent and/or broad and/or a receive aperture that exceeds the Fresnel scale (to average out any smaller diameter intensity variations (within the beam footprint)). The use a smaller diameter beam has a significantly reduced likelihood of passing through differently moving air currents and thereby experiencing break up. The use of the divergent beam reduces the likelihood that the beam footprint will wander off of the receiver aperture. As will be appreciated, a collimated beam of diameter "d" and wavelength "w" maintains its diameter for the Rayleigh range. After the Rayleigh range, the collimated beam diverges at an angle defined by w/d. The diverging beam diameter at any distance "z" from the transmitter (but beyond the Rayleigh range) is referred to as the footprint of the beam and is defined by wz/d.

The architecture controls the detrimental effects of atmospheric turbulence at the receiver by using a diffractive optical element to provide a plurality of converging optical signals (having spatially offset focal points) corresponding to differing optical wavelengths and/or an immersed detector to at least substantially maximize the optical signal power received by the detector. An essentially hemispherical immersion lens is positioned between the diffractive optical element and the detector to increase substantially the irradiance of the optical signal on the photoactive area of the detector.

Figure 1:
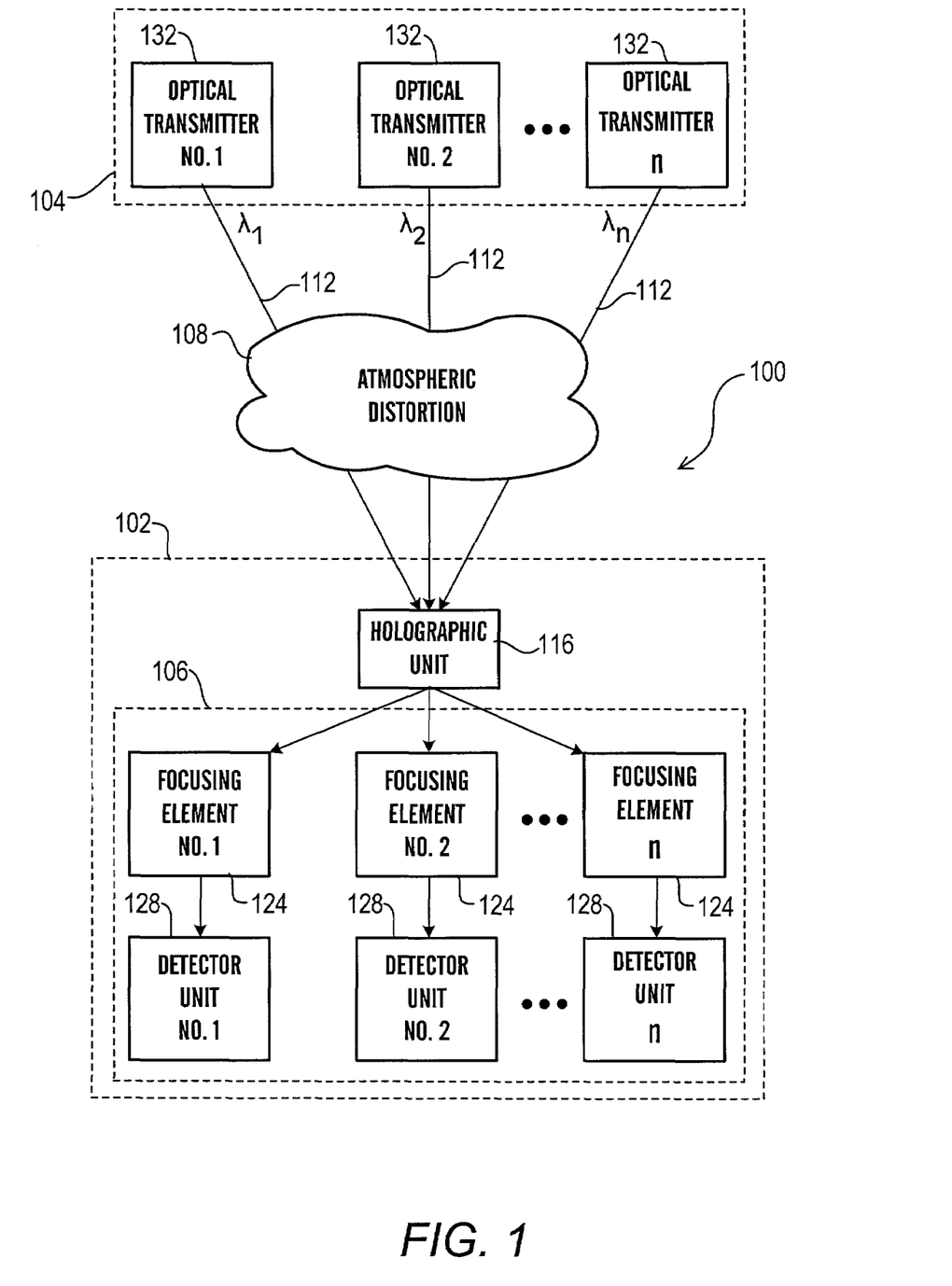
FIG. 1 is a block diagram of a laser communication system which communicates at high data rates through the atmosphere.

With reference to FIG. 1, a simplex embodiment of a laser communication system 100 is shown in block diagram form. The laser communication system 100 includes a laser communication transmitter 104 and a laser communication receiver 102. As will be appreciated, a duplex system may be implemented by placing a transmitter and receiver at each end of the link.

The Laser Communication Transmitter

The laser communication transmitter 104 can include one or a number of optical transmitters 132. The optical transmitters 132 each transmit a modulated laser beam 112 having a different wavelength λ. In one embodiment, there are four modulated laser beams 112 having wavelengths near 1550 nanometers where each wavelength differs by approximately 4 nanometers. Each laser beam 112 has a footprint which is increased by the atmospheric distortion 108. The footprint is a cross-sectional diameter of the laser beam 112 at the receive terminal focal plane 106.

Data is modulated in one or more of intensity, frequency, and phase onto a laser light carrier and is demodulated later from the laser light carrier in order to transport data great distances. The present embodiment assumes that intensity modulation of the transmit laser is used. In the laser communication transmitter, an optical transmitter 132 modulates data on a laser light carrier to form a modulated laser beam 112. The laser beam 112 is modulated with data at a rate greater than about 1 gigabit/sec. and preferably, greater than about 2 gigabit/sec. In order for the laser beam 112 to reach the laser communication receiver 102, the beam 112 travels through atmospheric turbulence 108.

The atmospheric turbulence 108 along the transmission path causes wavefront distortion in modulated laser beams 112. In other words, atmospheric turbulence 108 from thermal currents bends the collimated or diverging laser beams 112 and/or fragments the beam, thereby causing mutual interference or cancellation and so produces burst errors in the data stream.

Figure 2:
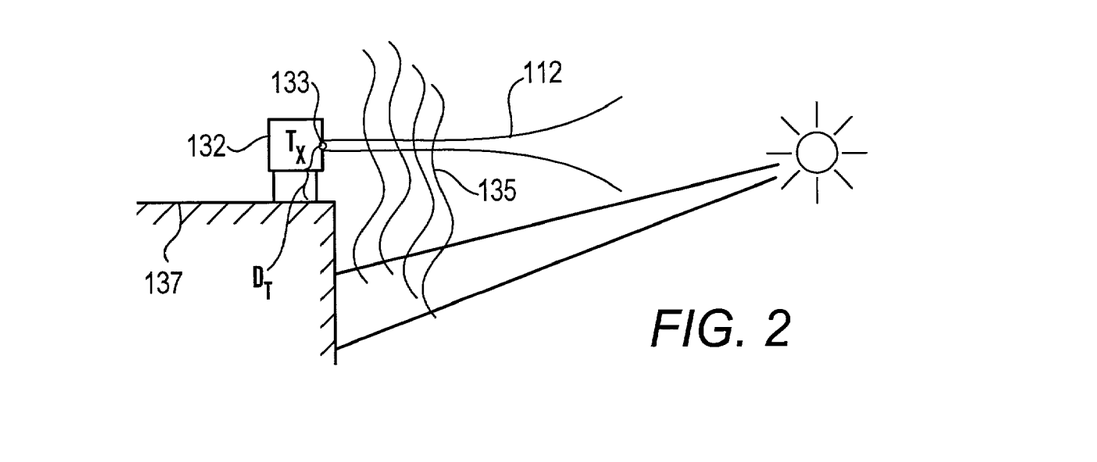
FIG. 2 depicts a technique for reducing the adverse effect of the atmospheric turbulence at the transmitter aperture.

To overcome or reduce the effect of atmospheric distortion 108 on the bit error rate (BER), the diameter of each of the modulated laser beams 112 at the point 133 (FIG. 2) at which each beam exits its corresponding transmitter 132 (or the aperture of the transmitter) is preferably selected such that the diameter is less than the inner scale of the atmospheric turbulence (or thermal currents) at the respective exit point.

As will be appreciated, the inner scale is typically a function of the temperature of any adjacent thermally conductive surface(s), the ambient air temperatures, the distance from the transmit aperture to the adjacent surface(s) and wind speed. The inner scale is commonly from about 5 to about 20% of the distance "$D_T$", (FIG. 2) from the adjacent surface 137 from which the thermal currents are emanating. For example, if the aperture of the transmitter is located at a distance $D_T$ of 200 mm above a rooftop, the inner scale would be around 20 mm. Generally, it is desirable to position the transmitter aperture far enough from an adjacent heat absorbing surface such that the inner scale is at least about 20 mm.

In selecting the desired diameter for the beam at the transmit aperture, it is preferable to select the worst case for the particular location and environment in which the transmitter aperture is to be positioned. A suitable safety factor can then be applied to the inner scale and/or beam diameter or the beam diameter otherwise reduced to provide a beam diameter which will be safely below the inner scale under "worst case" conditions. Typically, the diameter of the (Gaussian) transmit beam 112 is no more than about 12.5 mm, more typically it ranges from about 1 to about 10 mm, and even more typically from about 2 to about 5 mm.

As will be appreciated, the beam diameter selection for each of the beams 112 is made independently. Each of the beams 112 could have a different diameter depending upon the magnitude of the inner scale at the point at which the beam 112 exits the corresponding optical transmitter 132.

Figure 3:
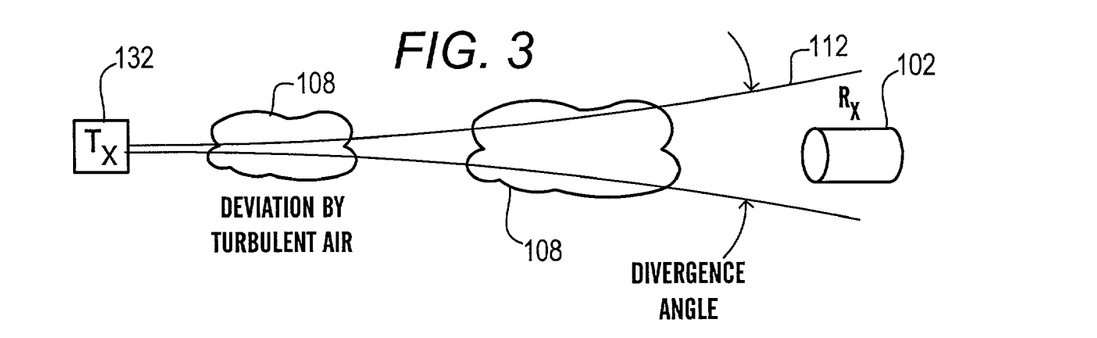
FIG. 3 depicts the relationship between divergence angle and the optical receiver.

The divergence angle of the broad beam is selected preferably by determining the "worst case" atmospheric induced deviation of the beam along the beam path and selecting the divergence angle of the beam (FIG. 3) to exceed the turbulence-induced beam deviation for the beam under the worst case conditions. A suitable safety factor can be applied to the divergence angle, as desired. The divergence angle causes the far-field footprint of the beam 112 to remain on the receiver aperture despite atmospheric turbulence. Accordingly, beam 112 should be aimed properly at the receiver even when the beam is subjected to substantial deviation due to atmospheric turbulence 108. Typically, the divergence angle is at least about 20 μr but needs be no more than about 2000 μr and more typically ranges from about 50 μr to about 1000 μr.

Figure 4:
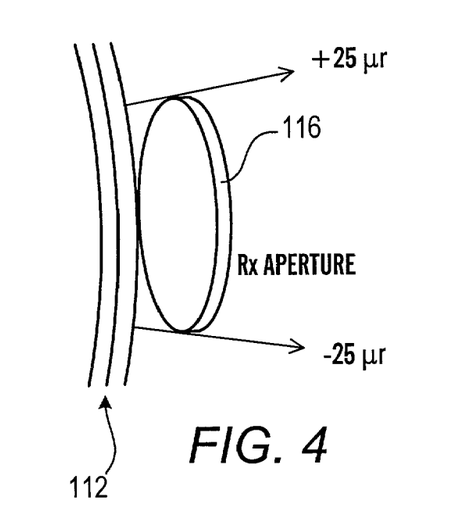
FIG. 4 depicts a technique for positioning the optical receiver aperture relative to the divergent optical signal.

To provide further assurance that the far-field footprint of the beam remains on the face of the receiver, the receiver should be oriented properly relative to the incoming beam 112. Referring to FIG. 4, the aperture 116 of the laser communication receiver 102 is preferably positioned/sized relative to the laser communication transmitter 104 such that the receiver 102 subtends at least about 20 μr and more preferably at least about 50 μr of the diverging transmit beam 112 (as shown in FIG. 4).

Although FIG. 1 illustrates a simplex (one-way) system, it is to be understood that the various inventions discussed herein can be used in a full duplex (two-way) system in which one or more transmitters and receivers are positioned at each end of the link.

The Laser Communication Receiver

Referring again to FIG. 1, included in the communication receiver 102 is a holographic unit 116 (or other diffractive optical element), which is a primary optic for the laser communication receiver 102 and a detector assembly 106. The detector assembly 106 includes a focusing element 124 and a detector unit 128 for each modulated laser beam 112. In this embodiment, the transmitter 104 is located in a satellite and the receiver 102 is located in a ground station. However, other embodiments could put the receiver on a building and the transmitter on an airplane (because the receiver benefits are best realized when it is in atmospheric turbulence).

Figure 5:
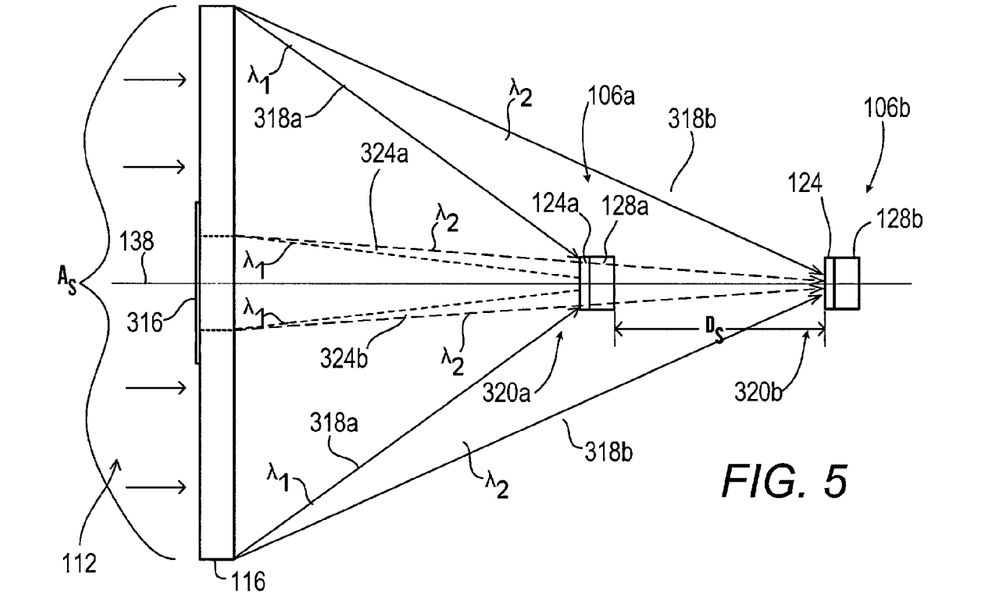
FIG. 5 is a schematic view of an optical receiver according to an embodiment of the present invention.

In the laser communication receiver 102, the holographic unit 116 focuses the laser beam 112 into a focus area on a focusing element 124 and detector unit 128. Referring to FIG. 5, a single holographic unit 116 focuses each laser beam 112 on its respective focusing element 124 and detector unit 128, which is positionally offset (spaced apart) from the other (adjacent) focusing element 124 and detector unit 128. Typically, the distance $D_S$ between adjacent detector assemblies 106a,b ranges from about 1 to about 10 mm with about 2 mm being more typical. As will be appreciated, FIG. 5 is not drawn to scale, with the distance $D_S$ being exaggerated relative to the diameter of the diffractive optical element 116. for clarity As can be seen from FIG. 5, the longitudinal axes of the detector units 124 are typically parallel and collinear, and the longitudinal axes of the focusing elements 124 are also typically parallel and collinear. The axes of these components are typically parallel to and collinear with the optical axis 138 of the holographic unit 116. As will be appreciated, the aperture size "$A_S$" of the holographic unit is determined by exceeding the Fresnel scale. By way of example, for a distance between the laser transmitter aperture and laser receiver aperture of 7.25 km and a wavelength of 1.55 microns, the Fresnel scale is $\sqrt{7250\text{m} \times 1.55\mu\text{m}}$ or 106 mm. The receive aperture is therefore larger than 106 mm and preferably about 400 mm. The modulated laser beams 112 are aimed at the holographic unit 116, whereafter, the laser beams 112 are focused by the holographic unit 116.

The operational differences between reflective and transmissive diffractive optical elements can lead to different receiver configurations. In reflective diffractive optical elements, the focused beam comes from the radiation-receiving side of the element while in transmissive diffractive optical elements the focused beam comes from the opposite side of the element from the radiation-receiving side.

Figure 6A:
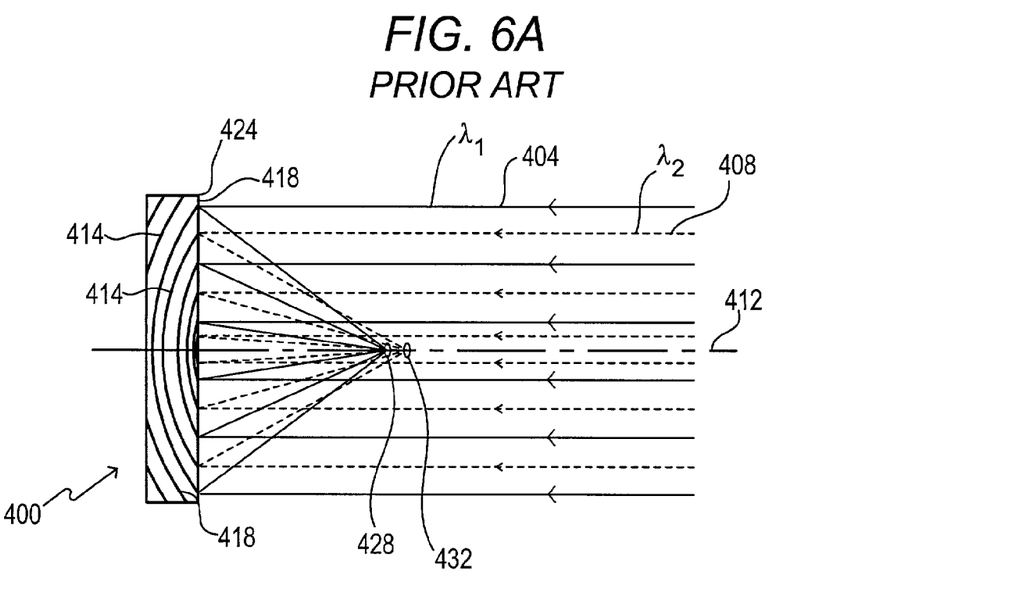
FIG. 6A is a schematic view of focal cones for different wavelength radiation being focused by a reflective hologram.

Referring to FIG. 6A, for example, the operation of a reflective hologram 400 is depicted. The reflective hologram 400 focuses radiation 404, 408, corresponding to $\lambda_1$ and $\lambda_2$ respectively, at differing spacial locations along the optical axis 412 of the hologram. The hologram 400 includes a plurality of concentrically disposed, concave, spherical shells 414 in an emulsion. The locations 418 where the concave spherical shells 414 intersect the hologram surface 424 are spaced inversely with radial position relative to the optical axis 412 of the hologram. This feature ensures that different rings of radiation will phase up to form a cone of light converging to a focus 428, 432 (which correspond respectively to radiation 404 and 408) and that the distance of that focus from the hologram surface 424 will vary inversely with the wavelength of the radiation. For example, the distance of focus 428 from surface 424 is an inverse function of wavelength $\lambda_1$, and the distance of focus 432 from surface 424 is an inverse function of wavelength $\lambda_2$. A "thick" or "volume" hologram such as that in FIG. 6A has a number of weakly reflecting spherical shells 414 which will cause only radiation for which the spacing of the shells is about one-half of the radiation wavelength to be focused. All other wavelengths of radiation will pass through the hologram. A reflective zone plate would be formed by, for example, evaporating a plurality of concentric silver rings on the plate surface with the spacing between the rings (not shown) varying inversely with the radial position of the ring. The rings would be in the same positions as the ring-shaped intersections between shells 414 and hologram surface 424.

Figure 6B:
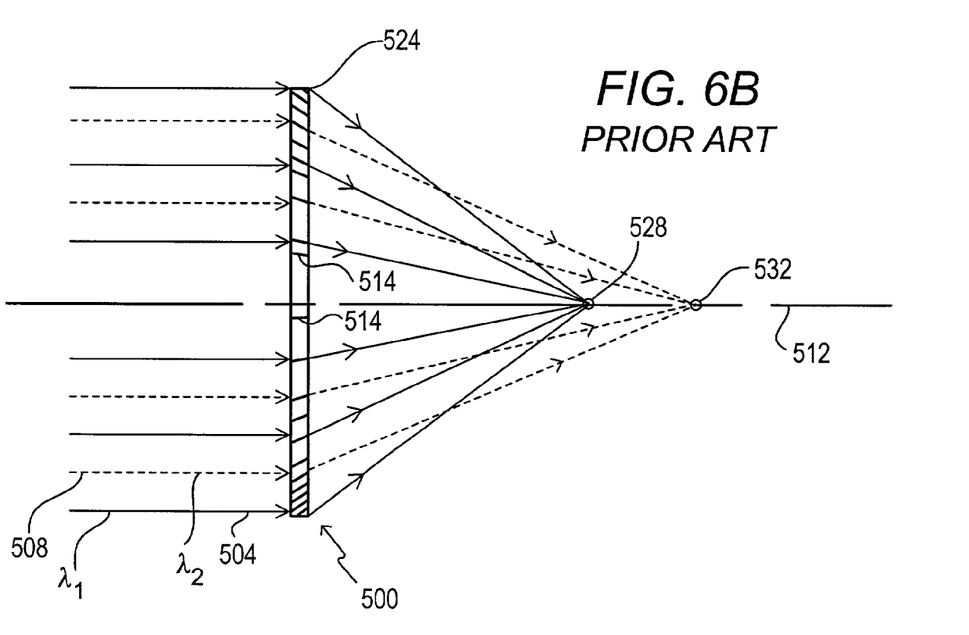
FIG. 6B is a schematic view of two focal cones for differing wavelength radiation being focused by a transmissive hologram.

Referring now to FIG. 6B, a transmissive hologram 500 is depicted. The transmissive hologram 500 causes radiation 504 and 508 having wavelengths $\lambda_1$ and $\lambda_2$, respectively, to focus at different spacial locations 528, 532 along the optical axis 512 of the hologram 500. The transmissive hologram 500 focuses light to the far side of the hologram. The hologram 500 includes a number of annular rings 514 (which appear as a plurality of concentrically disposed rings on hologram surface 524) having a spacing that scales inversely with radial position relative to the optical axis 512. This feature insures that at least some of the concentric rings of radiation passing through the hologram will phase up to create a converging cone of light. The hologram's focal length varies inversely with radiation wavelength. In this manner, all wavelengths shorter than 1.5 microns focus farther from the hologram than does 1.5 microns wavelength. Also, since the annular variations are difficult to reproduce correctly near the optical axis 512 where the spacing is large, the central zone is typically useless. If concentric rings 514 were simply painted onto a flat glass plate, the hologram 500 would be a transmissive zone plate. Alternatively, the rings 514 can be formed by simply etching grooves on the surface. If, as shown, the rings 514 are index ripples and in emulsion, the optical element would be a hologram As will be appreciated, other wavelength bands that are supported by available or developed transmit/receive technologies can also be used with the inventions set forth herein.

Although only holograms are discussed in the detailed description, it is to be expressly understood that any type of diffractive optical element can be employed in place of the holographic unit 116.

Referring again to FIG. 5, the holographic unit 116 is a transmissive hologram that preferably focuses each of the laser beams 112 into a converging cone. Because, as noted above, each laser beam 112 has a different wavelength $\lambda$, the focal area (i.e., the tip of the each cone-shaped focus) or focal point is at a different distance from the holographic unit 116. In this embodiment, the focal cone defined by lines 318a for $\lambda_1$ is about 60° to provide good separation between the modulated laser beams 112. Preferably, the focal cone for the various wavelengths ranges from about 30 to about 120° for optimum results.

As will be appreciated, the beams can contact the holographic unit simultaneously or sequentially (at different times), depending on the application. It is also possible for a beam to include multiple wavelengths of radiation, each wavelength representing a different channel and including different transmitted data.

As will be appreciated, the transmissive holographic unit 116 of FIG. 5 has a central obscuration 316 which blocks radiation. As noted, the obscuration is a result of the difficulty in producing the annular variations near the optical axis where the inter-annular variation spacing is large. The obscuration thus creates a shadow. To avoid optical losses, a first detector assembly is located in the shadow of radiation having shorter wavelengths that is detected by detector units positioned behind (or downstream of) the first detector assembly. Referring to FIG. 5 for example, first radiation 318a of a first (mean or median) wavelength $\lambda_1$ is focused on a first focal area 320a at which a first detector assembly 106a is positioned. The set of dotted lines 324a represent the shadow of the central obscuration 316 for the first wavelength radiation but the shadow typically vanishes at the associated detector. Second radiation 318b of a second wavelength $\lambda_2$ is focused on a second focal area 320b at which a second detector assembly 106b is positioned. The set of dotted lines 324b represent the shadow of the central obscuration 316 for the second wavelength radiation. As can be seen, the first detector assembly 106a is positioned in the shadow of the set of dotted lines 324b and therefore the first detector assembly 106a does not cause significant optical losses of the second radiation. This effect can be realized by selecting proper wavelengths of radiation for use in each of the channels, such as for example wavelengths of 1550, 1154, and 1558 nanometers for a three-channel system.

After passing through the atmospheric distortion 108 and being focused by the holographic unit 116, the spot size at the tip of the cone-shaped focus of this embodiment is typically greater than about 100 microns or is approximately 200 microns in diameter. If a 40 micron detector were used with a spot size of 200 microns, only 4% of power would reach the detector. The holographic unit 116 is a passive element and does not allow reshaping of the hologram surface to improve focus. Adaptive optics which allow reshaping of the optics can reduce this spot size with resultant improved focus, but they are expensive and complex.

Figure 7:
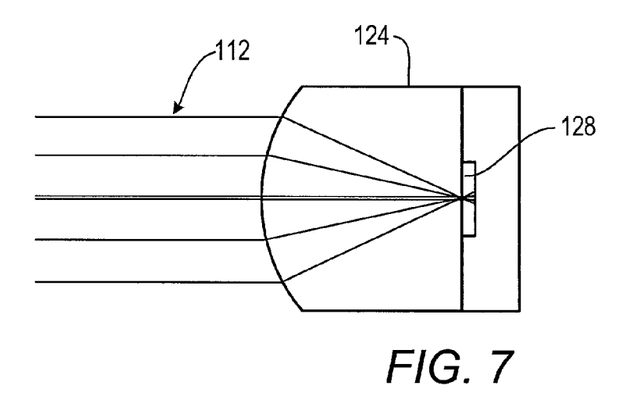
FIG. 7 is a schematic view of an optical detector assembly according to an embodiment of the present invention.

Referring to FIG. 7, the focusing element 124 overcomes the large focal area of the hologram by receiving the laser beam 112 from the holographic unit 116 and further focusing the light to reduce the spot size diameter. Reducing the spot size allows focusing more light while using a detector diameter small enough for compatibility with high speed transmission on the detector unit 128 which improves data transmission efficiency. The focusing element 124 can be any lens or optical component that increases the irradiance of the focal spot of the radiation. As will be appreciated, light can be focused to a spot whose diameter is inversely proportional to the refractive index of the lens medium 124. For example, a semiconductor immersion lens typically reduces the wavelength of light in air by a factor of about 3 to 4 (i.e., an index of about 3 to 4). In other words, the immersion lens reduces the wavelength of light while within the lens. Preferably, the focusing element increases the intensity of the light by at least a factor of nine. To realize these objectives, the element will typically have an index of refraction of at least about 2.3 and more typically that ranges from about 3.2 to about 4.0. The radius of curvature of the focusing element 124 typically ranges from about 400 to about 600 microns and more typically about 500 microns.

The focusing element 124 typically reduces the spot size of the incident radiation as focused by the holographic unit 116 to a diameter that is less than the photoactive diameter of the detector unit. In an exemplary application, the focusing element 124 reduces to 50 microns the typically greater than about 100 microns and more typically greater than about 200 microns spot size of the beam. Preferably, the spot size is reduced to about 60 microns or less and more preferably to about 40 microns or less. In other words, the spot size of the beam contacting the element 124 is preferably reduced by the focusing element to the photoactive area of the detector unit or less.

The focusing element 124 is preferably one or more of a (solid) immersion lens, and/or an oil immersion lens. Preferably, the focusing element 124 is made of Silicon or Germanium which respectively have indices of refraction of 3.5 and 4 or InP or GaP with indices of refraction near 3.2. Silicon is preferred for wavelengths around 1500 nm and Germanium is preferred for wavelengths around 2000 nm to maximize throughput. Other possible SIL designs that can be employed in the present invention are described in U.S. Pat. No. 6,114,688, which is incorporated herein by this reference.

The focusing element 124 is preferably in physical contact with the detector unit for best results. This physical contacting is known as "immersion". Immersion can be realized by any suitable technique, such as coaxial alignment and spring force or integral manufacture as discussed below.

The detector unit 128 receives and converts the modulated laser beam 112 into an electrical signal which contains the modulation data. At data rates above 1 gigabit/sec., wide band detectors are required, such as a PIN diode, avalanche photodiode or the like. However, wide band detectors with a large diameter are currently unavailable. As detectors get larger their capacitance increases. If large enough, this capacitance obscures the modulated data. Accordingly, for data rates above 1 gigabit/sec., currently available PIN diodes are generally limited to a diameter of no greater than approximately 60 microns.

Figure 8:
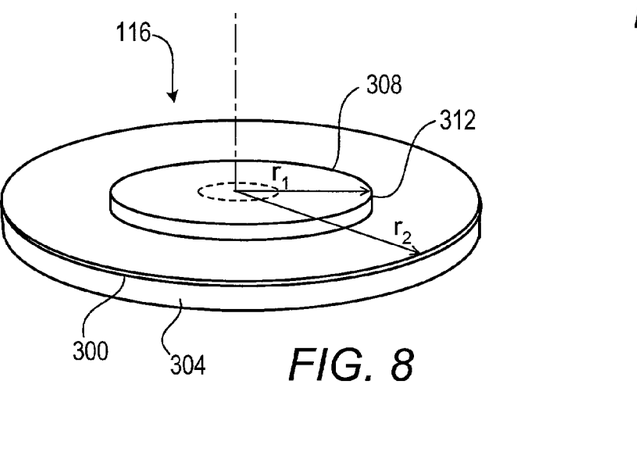
FIG. 8 is a perspective view of a transmissive holographic unit according to an embodiment of the present invention.

Referring to FIG. 8, a transmissive holographic unit 116 according to another embodiment is schematically shown. The holographic unit 116 includes an emulsion layer 300, a flat glass disc 304, and a phase retarder 308.

The phase retarder 308 is any suitable material for altering the phase of the data pulse passing through the phase retarder, e.g., a glass plate. Radiation that contacts the outer peripheral portion of the holographic unit (the area between radii $r_1$ and $r_2$) travels a further distance than radiation contacting the central portion of the holographic unit (the area having the outer radii $r_1$). This delay will cause the portions of the data pulse contacting in these areas to arrive at the detector(s) at different times, leading to smearing of data from differing radiation pulses. The phase retarder 308 causes the data from a given pulse of radiation to arrive at the detector(s) at more nearly the same time. The value of $r_1$, or the location of the outer periphery 312 of the phase retarder 308, is based upon the desired maximum value of the predetermined time difference. The thickness "t" of the phase retarder typically ranges from about 10 mm to about 30 mm, and $r_1$ from about 50 to about 80% mm of the hologram radius.

In the absence of the phase retarder, radiation that is focused by peripheral portions of the primary optic will travel a longer distance than radiation that is focused by central portions of the primary optical lens. The different distances traveled can cause data from different pulses to arrive at overlapping times and therefore limit the usable modulation bandwidth. The phase retarder is typically positioned over the central portion of the primary optical lens to cause all portions of the same pulse to arrive within a predetermined time interval of one another and thereby avoid juxtaposition of data from differing pulses.

Figure 9:
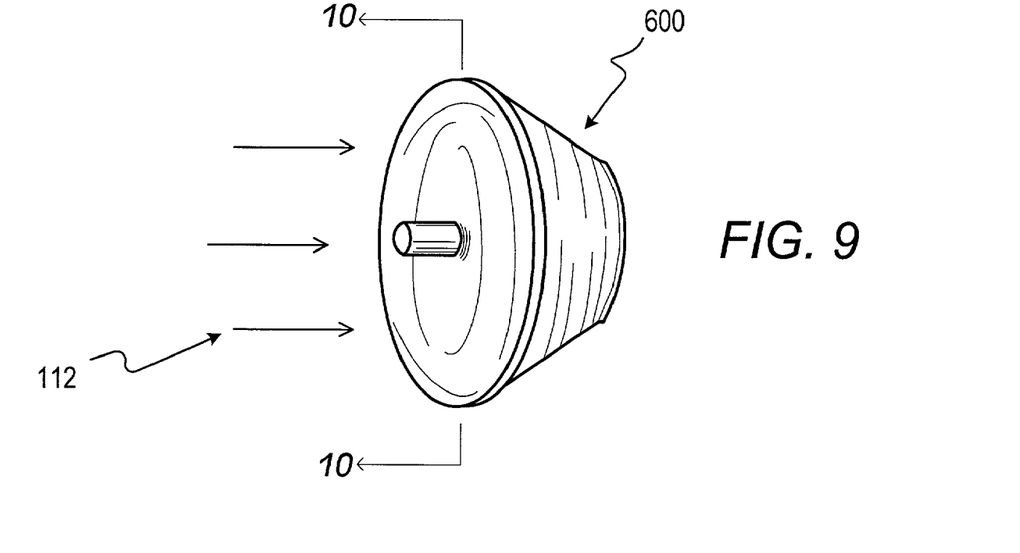
FIG. 9 is a perspective view of an optical receiver according to an embodiment of the present invention.
Figure 10:
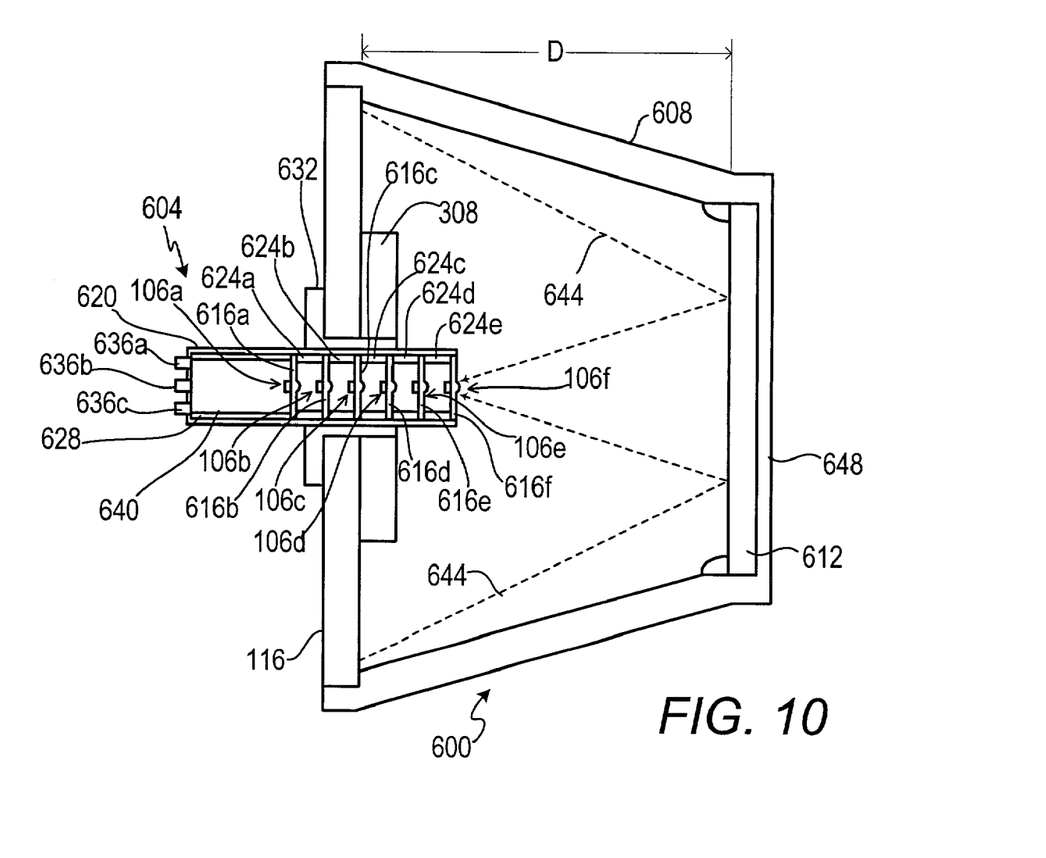
FIG. 10 is a cross-sectional view along line 10—10 of the optical receiver of FIG. 9.

Referring to FIGS. 9–10, a preferred configuration of a six channel laser communication receiver is depicted. The receiver 600 includes transmissive holographic unit 116, a detector barrel 604 positioned in the central obscuration of the holographic unit 116, frustoconcial outer housing 608, reflective surface 612, and phase retarder 308. The detector barrel 604 includes a plurality of detector assemblies 106a–f, each attached to a transparent substrate 616a–f; outer cylindrical housing 620, spacer rings 624a–e positioned between adjacent detector substrates 616a–f to maintain desired spacings between the detector assemblies 106a–f, end spacer ring 628 to maintain the rearmost substrate 616a in the desired position, locating flange 632 to ensure that the detector barrel 604 is mounted and retained in the proper position, and a plurality of coax connectors 636a–c (six total), each of which corresponds to a separate receive channel. The coax connectors 636 may be attached to a respective detector unit via conductors 640 located along the inner housing wall.

The reflective surface 612, as shown by dotted lines 644, causes incoming radiation to be directed in a reverse direction (or folded back) into the detector barrel. The reflective surface 612 is positioned at a distance "D" from the holographic unit 116 that is approximately equal to one-half of the focal length of the holographic unit 116. In an F/1 holographic unit, for example, the distance "D" is one-half of the aperture size of the holographic unit.

As will be appreciated, the reflective surface 612 could be omitted in which case the detector barrel 620 would be located in the base 648 of the housing 608. This design may not be preferred due to the significantly longer length of the housing, which can be problematic in many space restricted applications. The reflective surface can be any suitable reflective optical component, such as a full silvered mirror.

Figure 11:
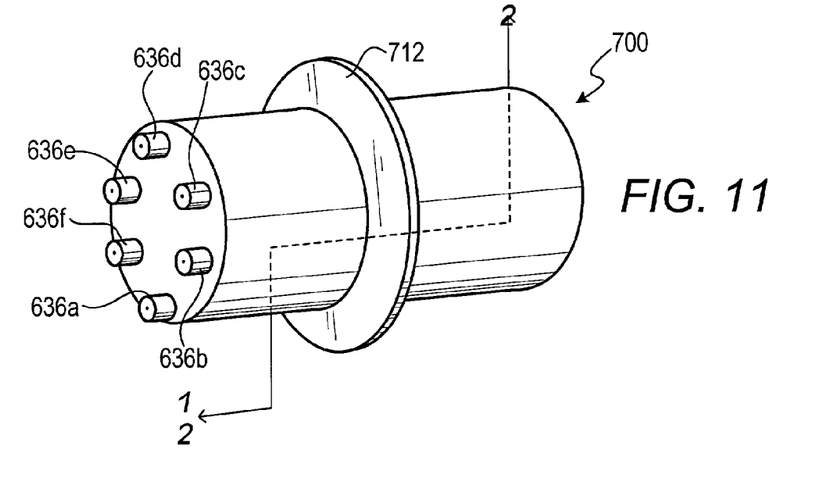
FIG. 11 is a perspective view of a detector barrel for a six channel optical receiver.
Figure 12:
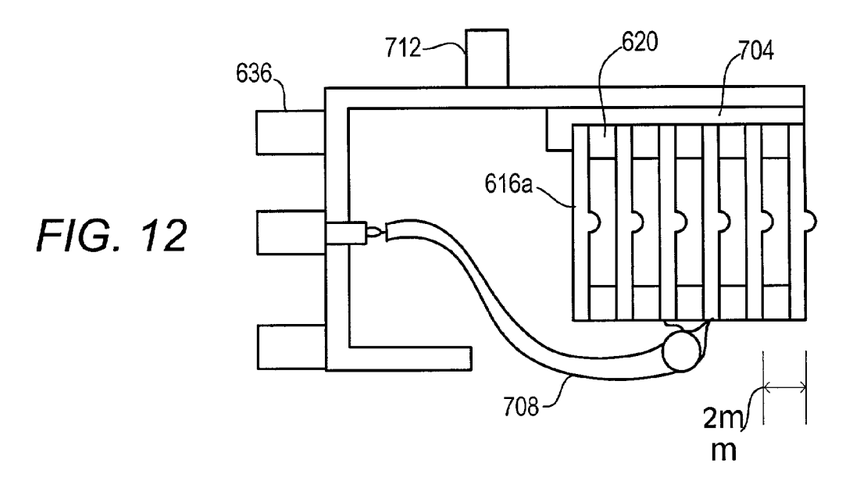
FIG. 12 is a cross-sectional view taken along line 12—12 of the detector barrel of FIG. 11.

FIGS. 11 and 12 depict a detector barrel 700 according to another embodiment. In contrast to the barrel 604, the barrel 700 includes a cylindrical inner detector ring 704 to position the rearward most detector substrate 616 in position. Spacer rings 620 are used as noted to hold the remaining detector substrates 616 in position. This barrel design further includes a length of a waveguide 708, such as a coax conductor that extends from each coax connector 636 to a respective detector assembly. As will be appreciated, the waveguide could be any outer suitable RF interface to post detector electronics. The locating flange 712 is ring-shaped. The interface from the detector assemblies to the next stage or electronics (e.g. amplifier) can be any interface known to one of ordinary skill in the art.

Figures 13, 14:
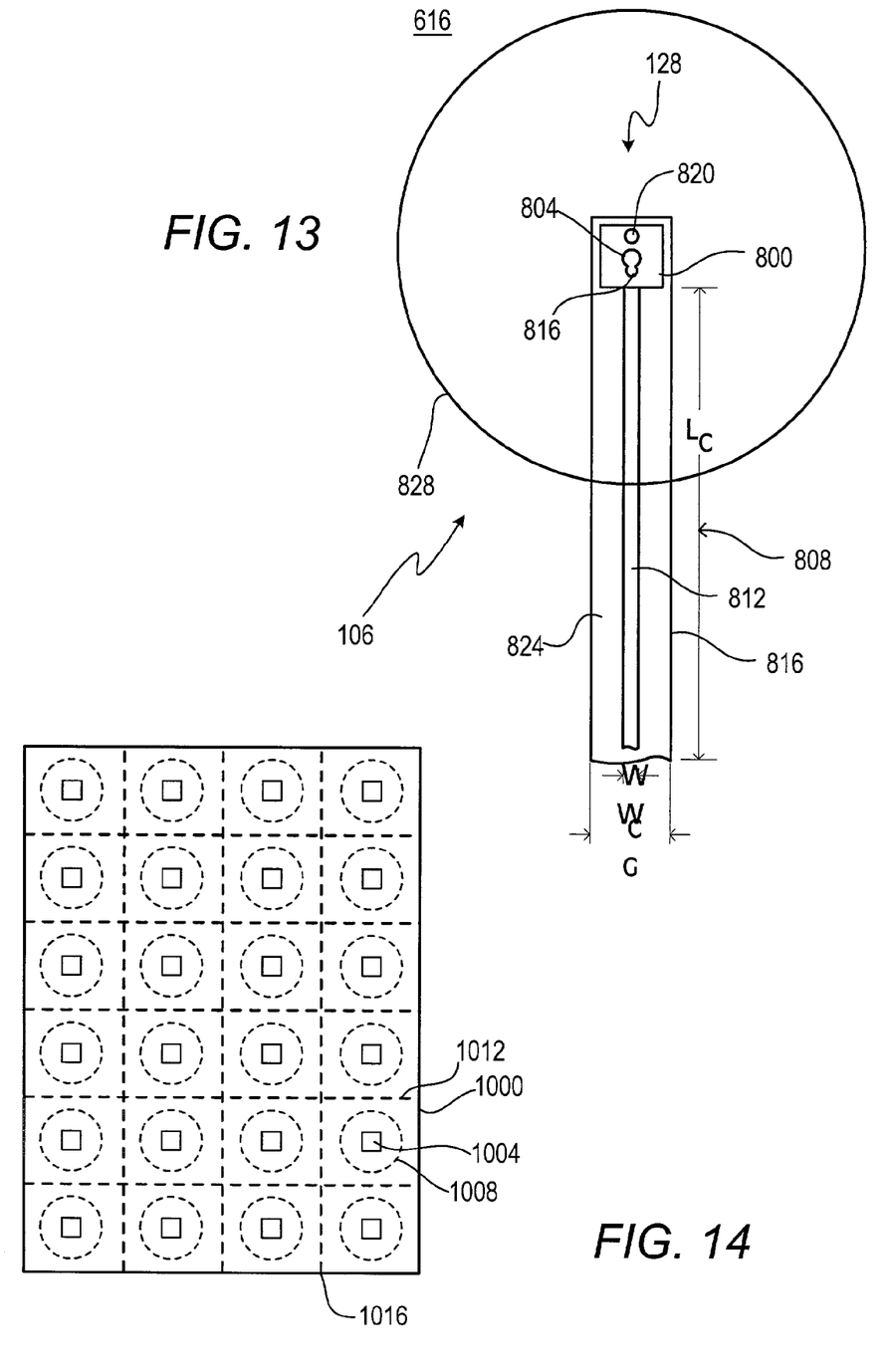
FIG. 13 is a front view of a detector assembly according to an embodiment of the present invention.
FIG. 14 is a plan view of a substrate including a plurality of detector units and a corresponding plurality of lenses or essentially hemispherical surfaces.

FIG. 13 depicts a preferred design for each detector assembly 106. The detector assembly 106 includes a detector unit 128 positioned on the substrate 616 which is transparent to radiation of the desired optical wavelength (FIG. 10) and which is in the plane of the page. The typically square area 800 is the curved face of immersion lens or focusing element and the round area 804 is the photo active area of the detector unit 128. The width and height of the rectangular immersion lens typically each range from about 100 to about 300 microns and is more typically about 200 microns while the diameter of the round active area 804 typically ranges from about 30 to about 80 microns.

Because of the potential data losses in the conductors from the detector unit to the coax connector 636 at the high data transmission speeds noted above, the conductors are designed according to known transmission line theory. As will be appreciated, the conductors are impedance matched with the detector unit and next stage of the electronics to reduce RF losses. The next stage is most likely an RF interface to a printed circuit board which is followed by an amplifier. The shape of the waveguide typically has stub sections to balance the photodiode impedance and may not be a pure rectangle as shown in the figure. The transmission line can be designed "downward" from the detector unit. The transmission line is preferably a waveguide such as a microstrip or coplanar configuration. In one configuration, a microstrip transmission line 808 extends downwardly from the detector unit 128. The microstrip transmission line 808 includes a conductor 812 and ground plane 816. A first conductive material or "bump" 816, such as indium, attaches to the conductor 812 and a second conductive material or "bump" 820 attaches to the ground plane 816.

The dimensions of the microstrip transmission line 808 depend on the application. By way of illustration, the ground plane 816 can be about 250 microns in width ("$W_G$"); the conductor 812 about 50 microns in width ("W_C"), and the conductor and ground plane separated by about 25 microns (or about 50% of the width of the conductor) of an electrically insulative material, such as a polymide. The length ("L_C") of the conductors depends upon the pulse length of the beam and the impedance of the detector unit and next stage of electronics. For example, if the beam has a pulse length of about 4 inches the length "L_C" of the conductors should be less than 10% of the pulse length or less than about 0.4 inches. The cone of radiation 828 converging on the next detector unit is approximately 2 mm in diameter in the plane of the detector unit 128 (or in the plane of the page) and is therefore not blocked to an appreciable extent by the detector unit 128.

The process for manufacturing the detector unit and the focusing element (which further focuses the focal spot of the diffractive optical element) will now be discussed with reference to FIG. 14.

Numerous problems exist in aligning the detector active area and the focusing element using conventional techniques. Traditional techniques of aligning solid immersion lenses with detectors include coaxial alignment and spring force. Traditionally such detectors were on the order of 3 mm in diameter and the immersion lenses of 12 mm in thickness. For acceptable performance in high data rate optical communication, detector sizes are much smaller (e.g., 60 microns) to respond fast enough to temporally resolve the 400 picosecond or shorter pulses of a 2.5 gigabit per second data stream. Not only is it difficult to fabricate the 200 micron solid immersion lens desirable for the 60 micron detectors but also it is difficult to properly orient the lens' axis to that of the much smaller detector unit and subsequently maintain the force needed to produce physical contact without breaking either component. To make matters worse, detector units will typically use a gold wire bond in the electrical connections. These wire bonds are at a minimum 25 microns tall and can interfere with the process of producing physical contact between the SIL and the detector unit unless the back side of the SIL is no larger than the detector unit.

To overcome these problems, a plurality of detector units 1004 are simultaneously formed on a transparent substrate 1000 by known techniques (e.g., epitaxial growth followed by photolithography), the substrate 1000 thereafter thinned, and on the opposite side of the substrate 1000, an essentially hemispherical surface 1008 is aligned and formed opposite to the detector unit 128. Typically, the optical axis of the surface 1008 is aligned (collinear) with and is parallel to the center axis of the corresponding detector unit. In this manner, the alignment and attachment problems encountered with positioning a discrete immersion lens over a detector unit are avoided.

The substrate on which the detector(s) is grown can be any material that is transparent or semitransparent to the desired radiation wavelengths and has the properties referred to above for the focusing element. Preferred substrates include single crystals of indium phosphide, gallium arsenide, or gallium phosphide. Such substrates are transparent to incident signal power in the 1550 nm wavelength band. This combination of properties makes possible the admission of signal from the back (substrate) side through the substrate onto the detector unit.

After growth of the detector crystals 1004 and photolithography, the thickness of the substrate 1000 is typically thinned to the desired diameter of the focal element. For an f/1 lens, for example, the appropriate distance for a 200 micron diameter lens is also 200 microns, which is the reduced thickness of the substrate. Typically, the substrate 1000 is thinned to a thickness ranging from about 100 to about 400 microns.

The substrate 1000 is then etched by suitable techniques to form the plurality of focal elements or essentially hemispherical surfaces 1008, each of which is accurately registered or aligned to the location of a corresponding detector. Infrared microscopy can be used to align the mask used to deposit, for example, a photoresist mask on the substrate so that lenses can be wet-etched. Alternatively, the etching can be performed by other techniques such as reactive ion etching, in which an ion beam is directed at individual regions of the substrate for appropriate lengths of time to remove sufficient material to form continuously curved lenses. Another approach is to etch, either by wet process or by reactive ions, Fresnel-type structures as surrogates for the continuously curved lenses, or to approximate the continuous curves by a binary process which produces concentric steps at specific radii and height relative to reference axes. In addition to batch production of immersion lenses and precise coaxial registration of the lenses to a corresponding detector unit, the approach provides the intimate physical contact or detector immersion desired between the lenses and the detector units because they may be both fabricated onto the same substrate.

After batch processing is completed, the lens surfaces are anti-reflection coated. The anti-reflection coating can be any of a number of metal oxides or fluorides.

The substrate is then cleaved by any suitable technique (e.g., or sawed) along horizontal and vertical cut lines 1012, 1016 (which are arranged in a grid pattern) to form a plurality of discrete detector assemblies, each including a substrate, detector unit, and essentially hemispherical surface.

The detector unit can then be "bump" bonded, such as by indium, to another (second) transparent substrate on which the metal conductors have been previously deposited, such as in a microstrip or stripline configuration. Alternatively, the detector unit 128 could be positioned in a hole in the second transparent substrate on which conductors have already been deposited, as shown in FIG. 10.

Figure 15:
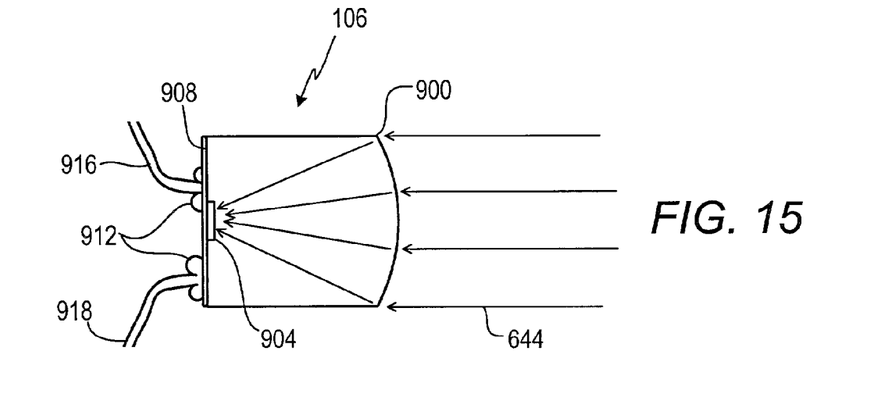
FIG. 15 is a cross-sectional view of a detector unit and immersion lens according to another embodiment of the present invention.

Another configuration for the detector assembly formed in this manner is shown in FIG. 15. The assembly includes an immersion lens 900 in physical contact with the detector unit 904. A protective coating 908 is formed on the rear surface of the immersion lens 900 and the detector unit 904. Wire bonds 912 connect positive and negative leads 916 and 918 to the detector assembly 106. The immersion lens 900 is, as noted, formed by etching a GaAs or similar substrate on which the detector unit is grown. The detector unit is preferably formed from InGaAs and has a photoactive area ranging from about 30 to about 80 microns in diameter. The diameter of the immersion lens 900 preferably ranges from about 200 to 300 microns.

In this configuration, such coupling through the substrate also avoids another problem of mating SILs to InGaAs-on GaAs detector units—namely the need for the refractive index to remain essentially constant (within a range of about 20% of one another) from the SIL to the detector unit. The reason this is a problem is that fabricators of such detector units typically add a protective coating over the photosensitive InGaAs skin atop the substrate. This protective coating unfortunately has a very low refractive index (typically about 1.5) compared to the SIL (typically about 3.5) and the photosensitive InGaAs skin (typically about 3.5) so the coating degrades passage of signal between the SIL and the InGaAs. By using the GaAs substrate as the SIL, this interface problem disappears. The roughly 200 micron diameter SIL/detector unit would be mounted on transparent substrate or plates 616 (FIG. 13), e.g., microscope slides, which also support transmission lens design for detector output to the electrical preamplifiers (not shown).

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. By way of example only, the invention need not be limited to a hologram as the primary optical element. Any optical element can be used that has zones or areas of varying transmission, reflection, and/or varying refractive index could alternatively be used. The present invention is intended to include other receiver designs not discussed above which would result from using a transmissive and/or reflective diffractive optical element. In the reflective configuration, the detector barrel would be positioned on the laser beam receiving side of the diffractive optical element as the various wavelengths would be reflected by the optical element and received by the spaced apart detectors. Alternatively, the various features noted above can be used separately as part of other transmitter or receiver configurations to realize numerous benefits. For example, the use of a small diameter, so divergent beam can be used with conventional optical receivers to provide significant reductions in burst error occurrence. The optical receiver can be used with a conventional large diameter narrow beam to provide reduced bit error rates. The various elements of the optical receiver can be used in conventional optical receiver designs to further provide enhanced benefits. For example, the use of a larger aperture receiver can provide enhanced benefits. A focusing element, such as the SIL described above, can be used in connection with an otherwise conventional optical receiver to provide reduced fades in the received power. The receiver discussed herein and/or a component thereof may be used in optical communication applications other than free space transmission. By way of example, the receiver and/or component thereof may be used in fiber optic applications, such as a demultiplexer or optical-to-electrical converter. In this application, the receiver would be positioned so as to receive the optical signal transmitted by an optical fiber cable. An optical fiber can be substituted for each detector unit to collect separately each particular wavelength of radiation. An example of such an application is described in U.S. Pat. No. 4,643,519, which is incorporated herein by this reference. Other techniques can be used to produce the focusing element. Examples are discussed in U.S. Pat. Nos. 3,239,675; 4,629,892; 4,636,631; 4,797,179; 5,545,896; and 5,652,813, all of which are incorporated herein by this reference. The detector assembly can be composed of discrete, interconnected components or integrated components. For example, the detector assembly can be an integrated photodetector chip, which would have an amplifier built on the same chip as the PIN detector unit. This design could alleviated some of the engineering problems associated with bleeding off the small RF signal from the detector unit. Because the detector unit feeds a microwave waveguide for some distance before amplification, the signal can pick up additional noise from the other densely packed detector-outputs and other sources (e.g., power supply). The RF signal could be swamped by noise before it reaches the active amplifier. An amplifier and other electronic circuitry for clock and data recovery traditionally follow the detector unit. Alternatively, a MEM (microelectronic mechanism or micromachine) can be integrated into the assembly. MEM's could be applied to a tracking mechanism/feature for orienting/aligning the receiver and emitter. The embodiments discussed hereinabove are further intended to explain the best mode known of practicing the inventions and to enable others skilled in the art to utilize the inventions in such, or in other embodiments and with the various modifications required by their particular application or uses of the inventions. It is intended that the appended claims be construed to include alternative embodiments to the extent permitted by the prior art.

What is claimed is:

1. A method for receiving high frequency signals transmitted through free space, comprising:
   passing one or more optical signals, the one or more optical signals containing data and being composed of radiation of a plurality of differing wavelengths, through a diffractive optical element to form a plurality of signal segments, each signal segment having a different mean wavelength;
   passing a portion of a beam comprising each of said one or more optical signals through a phase retarder that is provided separately from said diffractive optical element, wherein said portion of said beam passed through the phase retarder comprises an area of the beam that is less than a total area of the beam in cross-section, wherein said phase retarder has an area that is less than an area of said diffractive optical element, wherein a first portion of the optical signal is passed through said phase retarder, wherein the first portion of the optical signal has a different phase than a second portion of the optical signal that is not passed through the phase retarder, and
   detecting data in each of said plurality of signal segments at or near a different spatial focal point, wherein a portion of said plurality of said detected signal segments has passed through said phase retarder.

2. A method, as claimed in claim 1, further comprising, before the passing step:
   transmitting each of said optical signals through atmospheric distortion at a data rate that is greater than one gigabit/second for each wavelength.

3. A method, as claimed in claim 1, wherein the diffractive optical element is a hologram, a zone plate, or combination thereof.

4. A method, as claimed in claim 3, phase retarder has that is less an area, wherein said phase retarder defines a disc shaped area that is located adjacent a central portion of the diffractive optical element, and wherein said first portion is the radiation in the optical signal that contacts the diffractive optical element within a first radial distance of a center of the diffractive optical element while said second portion is the radiation that contacts the diffractive optical element outside the radial distance.

5. A method, as claimed in claim 1, wherein:
   in the detecting step, each of the plurality of signal segments is detected by a different detector.

6. A method, as claimed in claim 1, wherein:
   in the detecting step, the mean wavelength of at least one of the signal segments is reduced before the at least one of the signal segments contacts a detector.

7. A method, as claimed in claim 6, wherein at least one of the following conditions is true before a signal segment contacts a detector:
   the spot size of the signal segment is reduced by a lens;
   the mean wavelength of the signal segment is reduced by a lens; and the intensity of a signal segment is increased by a lens.

8. A method, as claimed in claim 1, wherein:
after the passing step and before the detecting step, the plurality of signal segments are reflected by a reflective surface.

9. A method, as claimed in claim 1, wherein:
the optical signal has a beam size at an aperture of a source transmitter associated with the optical signal that is less than an atmosphere inner scale.

10. A method, as claimed in claim 9, wherein the beam size at the transmitter is no more than about 10 mm.

11. A method for receiving high frequency signals transmitted through free space, comprising:
dividing an optical signal, the optical signal containing data and being composed of radiation of a plurality of differing wavelengths, into a plurality of signal segments, each signal segment having a different mean wavelength;
passing a portion of one of the divided optical signal and the optical signal through a phase retarder, wherein said portion is a partial cross section of the one of the divided optical signal and the optical signal;
reflecting said divided signals towards a plurality of spaced apart detectors;
reducing the spot size of the signal segments using an immersion lens that is integral to each of the plurality of detectors; and
detecting, with said plurality of spaced apart detectors data in each of said plurality of signal segments, wherein each of said spaced apart detectors is located substantially at a different focal point, the focal points being at different positions along a common optical axis, and wherein, and wherein each said focal points receives at least some of said portion of one of the divided optical signal and the optical signal passed through said phase retarder.

12. A method of claim 11, wherein each of the detectors in located in an end-to-end configuration relative to an adjacent detector.

13. The method of claim 12, wherein the longitudinal axes of each of the detectors are at least substantially parallel to one another.

14. The method of claim 13, wherein the longitudinal axes are at least substantially collinear.

15. The method of claim 11, wherein in the dividing step the optical signal is passed through a diffractive optical element and a first portion of the optical signal is passed through one or more phase retarders.

16. A method, as claimed in claim 15, wherein:
the first portion of the optical signal contacts a central portion of the diffractive optical element and wherein the first portion of the optical signal has a different phase than a second portion of the optical signal that is not passed through the one or more phase retarders.

17. A method, as claimed in claim 15, wherein:
said first portion is the radiation in the optical signal that contacts the diffractive optical element within a radial distance of a center of the diffractive optical element while said second portion is the radiation that contacts the diffractive optical element outside the radial distance.

18. A method, as claimed in claim 11, wherein:
in the detecting step, the spot size of at least one of the signal segments is reduced by a lens before the at least one of the signal segments contact a detector.

19. A method, as claimed in claim 18, wherein:
the spot size is reduced by an immersion lens.

20. A method, as claimed in claim 11, wherein:
the plurality of signal segments are reflected by a reflective surface after the dividing step and before the detecting step.

21. A method, as claimed in claim 11, wherein in the dividing step:
said optical signal is focused with a diffractive optical element.

22. A method, as claimed in claim 11, wherein:
the optical signal has a beam size at an aperture of a source transmitter associated with the optical signal that is less than an atmospheric inner scale.

23. A method, as claimed in claim 22, wherein the beam size is no more than about 10 min.

24. An apparatus for receiving an optical signal transmitted through free space, the optical signal being composed of radiation of a plurality of wavelengths, comprising:
at least one diffractive optical element for focusing a beam of radiation of different wavelengths at different corresponding focal points and thereby creating a focused beam of radiation, wherein said focal points are at different positions along the optical axis of said optical element, wherein said focal points are at different positions along the has a diameter that is greater than a Fresnel scale for said plurality of wavelengths and a distance from a transmitter, and wherein said focal points encompass a first area comprising a first spot size or greater;
a phase retarder, wherein less than an entire cross section of one of said beam of radiation of different wavelengths and said focused beam of radiation is passed through said phase retarder; and
a plurality of detectors, each detector being located at or near a different one of the focal points and receiving the radiation focused on the focal point corresponding to the detector, wherein each of the plurality of detectors has a photoactive area equal to a second area that is less than said first area, wherein each of said plurality of detectors is associated with a focusing element comprising an immersion lens that reduces the spot size of incident radiation to no more than said second area, and wherein a portion of said radiation focused on a focal point of at least two of said detectors has passed through said phase retarder.

25. An apparatus, as claimed in claim 24, wherein:
one of said immersion lenses is associated with each of the detectors to reduce the spot size associated with radiation converging on the respective detector.

26. An apparatus, as claimed in claim 24, further comprising:
a reflective surface positioned on a first side of the at least one diffractive optical element.

27. An apparatus, as claimed in claim 26, wherein:
at least some of the plurality of detectors are located in a hole in the at least one diffractive optical element.

28. An apparatus, as claimed in claim 26, wherein:
at least some of the plurality of detectors are located on a second side of the one or more diffractive optical elements, the second side being in an opposing relationship with the first side.

29. An apparatus, as claimed in claim 26 wherein:
the plurality of detectors are located between the reflective surface and the at least one diffractive optical element and along an axis of the at least one diffractive optical element.

30. An apparatus, as claimed in claim 24, wherein:
the at least one diffractive optical element has an obscuration and at least one of the plurality of detectors is located in a shadow of the obscuration with respect to radiation having a wavelength different from a wavelength of radiation converging on the at least one detector.

31. An apparatus, as claimed in claim 25, wherein:
at least one of the detectors is integral with the corresponding immersion lens.

32. An apparatus, as claimed in claim 25, wherein:
a plurality of the immersion lenses and a corresponding number of detectors have at least substantially parallel and collinear central axes and the central axes of the immersion lenses and corresponding detectors are at least substantially parallel and collinear with an optical axis of the at least one diffractive optical element.

33. An apparatus, as claimed in claim 24, wherein an aperture size of the holographic unit exceeds the Fresnel scale.

34. An apparatus for receiving an optical signal transmitted through free space, the optical signal containing data, comprising:
a first holographic element for focusing radiation including a number of different wavelengths, wherein each wavelength is focused to a different point;
a phase retarder having an area that is less than an area of the first holographic element, wherein the phase retarder has a maximum radius that is no greater than 80% of a radius of the first holographic element;
a number of detectors; and
a number of second lenses, wherein one of said second lenses is located between the first holographic element and an associated detector, the second lens reducing a spot size of the focused radiation after passing through the second lens, wherein at least some radiation passed through said phase retarder is passed through each of said second lenses.

35. An apparatus, as claimed in claim 34, further comprising:
a plurality of detectors, each detector being located at or near a respective focal point and receiving the radiation focused on the respective focal point.

36. An apparatus, as claimed in claim 35, wherein:
the plurality of detectors are positioned at spaced apart locations along an axis of the first lens.

37. An apparatus, as claimed in claim 35, wherein:
each of the second lenses is an immersion lens.

38. An apparatus, as claimed in claim 35, further comprising:
a reflective surface positioned on a first side of the first lens.

39. An apparatus, as claimed in claim 38, wherein:
at least some of the plurality of detectors are located in a hole in the first lens.

40. An apparatus, as claimed in claim 38, wherein:
at least some of the plurality of detectors are located on a second side of the first lens, the second side being in an opposing relationship with the first side.

41. An apparatus, as claimed in claim 38, wherein:
the plurality of detectors are located between the reflective surface and the first lens and along an axis of the first lens.

42. An apparatus, as claimed in claim 35, wherein:
the first lens has an obscuration and at least one of the plurality of detectors is located in a shadow of the obscuration with respect to radiation having a wavelength different from a wavelength of radiation converging on the at least one detector.

43. An apparatus, as claimed in claim 37, wherein:
at least one of the detectors is integral with the respective immersion lens.

44. An apparatus, as claimed in claim 34, wherein the second lens is an immersion lens having an index of refraction of at least about 2.3, having a radius of curvature ranging from about 400 to about 600 microns.

45. An apparatus, as claimed in claim 34, wherein the second lens has a radius ranging from about 200 to about 300 microns.

46. A method for receiving high frequency signals transmitted through free space, comprising:
first passing an optical signal, the optical signal containing data, through a first lens comprising a diffractive optical element provided as part of a receiver to form focused radiation having a first mean wavelength, wherein said first lens subtends at least about 50 microradians of a beam comprising the optical signal, and wherein at the receiver the optical signal has an angle of divergence of at least 20 microradians, and wherein less than an entire cross-section of the beam comprising the optical signal containing data is passed through a phase retarder that is provided in addition to the diffractive optical element;
second passing the focused radiation through a second lens to form converging radiation having a second mean wavelength, the first mean wavelength being different than the second mean wavelength; and
detecting data in the convergent radiation at a plurality of detectors, wherein at least some radiation received at each of said detectors has passed through said phase retarder, and wherein at least some radiation received at each of said detectors has not passed through said phase retarder.

47. A method, as claimed in claim 46, wherein:
the optical signal is composed of radiation of a plurality of differing wavelengths; in the first passing step the first lens is a diffractive optical element; the focused radiation includes a plurality of signal segments, each signal segment having a different mean wavelength; and in the first passing step only a first portion of the optical signal is passed through a phase retarder.

48. A method, as claimed in claim 46, further comprising, before the first passing step:
transmitting said optical signal through atmospheric distortion at a first rate that is greater than one gigabit/second.

49. A method, as claimed in claim 47, wherein:
the first portion of the optical signal contacts a central portion of the diffractive optical element and wherein the first portion of the optical signal has a different phase than a second portion of the optical signal that is not passed through the phase retarder.

50. A method, as claimed in claim 49, wherein:
said first portion is the radiation in the optical signal that contacts the diffractive optical element within a radial distance of a center of the diffractive optical element while said second portion is the radiation that contacts the diffractive optical element outside the radial distance.

51. A method, as claimed in claim 46, wherein:
in the detecting step, each of the plurality of signal segments is detected by a different detector.

52. A method, as claimed in claim 46, wherein:
the second lens is an immersion lens.

53. A method, as claimed in claim 47, wherein:
after the first passing step and before the second passing step, the plurality of signal segments are reflected by a reflective surface.

54. A method, as claimed in claim 46, wherein:
the optical signal has a beam size at an aperture of a source transmitter associated with the optical signal that is less than an inner scale.

55. A method, as claimed in claim 54, wherein the beam size is no more than about 10 mm.

56. An apparatus for receiving an optical signal, the optical signal containing data, comprising:
a first optical element for focusing a set of different optical wavelengths in the optical signal at different locations along a first optical axis of said first optical element;
a second optical element for retarding a phase of a portion of said optical signal;
a reflective surface for reflecting the focused set of different optical signals and a plurality of detectors forming a reflected set of different optical signals; and
a number of detectors, wherein for each detector there is an associated immersion lens, wherein the immersion lens of each detector is positioned to receive one of the reflected optical signals, the immersion lenses being located along the first optical axis, and wherein each detector receives at some of said at least a portion of said optical signal passed through said phase retarder.

57. An apparatus, as claimed in claim 56, further comprising:
a number of second lenses, wherein a second lens is located between the reflective surface and the detector, the second lens reducing a wavelength of the reflected optical signal, whereby a spot size of the reflected optical signal is reduced after passing through the second lens.

58. An apparatus, as claimed in claim 56, wherein:
the plurality of detectors are positioned at spaced apart locations along an axis of the first lens.

59. An apparatus, as claimed in claim 58, wherein:
the second lens is an immersion lens and a respective immersion lens is located between each of a plurality of detectors and the first lens to reduce a spot size associated with radiation converging on the respective detector.

60. An apparatus, as claimed in claim 58, wherein:
at least some of the plurality of detectors are located in a hole in the first lens.

61. An apparatus, as claimed in claim 58, wherein:
at least some of the plurality of detectors are located on a second side of the first lens, the second side being in an opposing relationship with the first side.

62. An apparatus, as claimed in claim 58, wherein:
the plurality of detectors are located between the reflective surface and the first lens and along an axis of the first lens.

63. An apparatus, as claimed in claim 58, wherein:
the first lens has an obscuration and at least one of the plurality of detectors is located in a shadow of the obscuration with respect to radiation having a wavelength different from a wavelength of radiation converging on the at least one detector.

64. An apparatus, as claimed in claim 58, wherein:
at least one of the detectors is integral with the respective immersion lens.

65. An apparatus, as claimed in claim 56, wherein the first lens has a focal length and the reflective surface is located at a distance from the first lens that is approximately equal to 50% of the focal length.

66. A method for receiving an optical signal transmitted through free space, comprising:
first passing the optical signal, the optical signal containing data, through a first lens to form a plurality of signal segments, each corresponding to a different median wavelength, wherein the first lens is a diffractive optical element;
second passing a portion comprising less than an entire area of a cross-section of the optical signal through a phase retarder;
reflecting the plurality of signal segments off a reflective surface to form reflected radiation; and
detecting data in the reflected radiation at or near an optical focal point for each of the signal segments, wherein a portion of each of said signal segments has passed through said phase retarder;
wherein the optical signal has a beam size that is less than a size of an inner scale in the vicinity of the source transmitter, and wherein passing a portion of the optical signal through a phase retarder reduces smear in the signal segments.

67. A method, as claimed in claim 66, wherein:
in the first passing step a first portion of the optical signal is passed through a phase retarder.

68. A method, as claimed in claim 67, wherein:
the first portion of the optical signal contacts a central portion of the diffractive optical element and wherein the first portion of the optical signal has a different phase than a second portion of the optical signal that is not passed through the phase retarder.

69. A method, as claimed in claim 67, wherein:
said first portion is the radiation in the optical signal that contacts the diffractive optical element within a radial distance of a center of the at least one of a holographic unit, diffractive optical element while said second portion is the radiation that contacts the diffractive optical element outside the radial distance.

70. A method, as claimed in claim 66, wherein:
in the detecting step, each of the plurality of signal segments is detected by a different detector.

71. A method, as claimed in claim 66, further comprising:
second passing the reflected radiation through a second lens to form converging radiation having a median wavelength different from the reflected radiation.

72. A method, as claimed in claim 71, wherein:
the second lens is an immersion lens.

73. A method, as claimed in claim 66, wherein the beam size is no more than about 10 mm.

* * * * *